(12) United States Patent
Zhu et al.

(10) Patent No.: US 12,313,768 B2
(45) Date of Patent: May 27, 2025

(54) SIGNAL PROCESSING METHOD AND APPARATUS

(71) Applicant: Shenzhen Yinwang Intelligent Technologies Co., Ltd., Shenzhen (CN)

(72) Inventors: Jintai Zhu, Beijing (CN); Dapeng Lao, Beijing (CN); Dejian Li, Beijing (CN); Jinnan Liu, Shenzhen (CN); Ben Wang, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 253 days.

(21) Appl. No.: 18/164,398

(22) Filed: Feb. 3, 2023

(65) Prior Publication Data

US 2023/0184886 A1     Jun. 15, 2023

Related U.S. Application Data

(63) Continuation of application No. PCT/CN2020/106864, filed on Aug. 4, 2020.

(51) Int. Cl.
   *G01S 7/35*           (2006.01)
   *G01S 13/58*        (2006.01)

(52) U.S. Cl.
   CPC .......... *G01S 7/356* (2021.05); *G01S 13/584* (2013.01)

(58) Field of Classification Search
   CPC ........ G01S 7/356; G01S 13/584; G01S 13/26; G01S 13/343; G01S 13/42; G01S 13/582; G01S 7/2883; G01S 13/58
See application file for complete search history.

(56) References Cited

U.S. PATENT DOCUMENTS

2018/0011170 A1\*    1/2018    Rao .................. G01S 7/354

FOREIGN PATENT DOCUMENTS

| CN | 108594233 B | \* | 7/2020 | ............ G01S 13/92 |
|----|-------------|---|--------|---------|
| JP | 4079084 B2 |  | 4/2008 |  |
| JP | 2017032531 A | \* | 2/2017 |  |

OTHER PUBLICATIONS

Sim et al., "Enhanced DOA Estimation Using Linearly Predicted Array Expansion for Automotive Radar Systems," IEEE Access, total 14 pages, Institute of Electrical and Electronics Engineers, New York, New York (Apr. 11, 2019).

\* cited by examiner

*Primary Examiner* — Olumide Ajibade Akonai
*Assistant Examiner* — Bongani Jabulani Mashele
(74) *Attorney, Agent, or Firm* — Leydig, Voit & Mayer, Ltd.

(57) ABSTRACT

This disclosure provides a signal processing method and apparatus. The method includes: obtaining Nr1×M1 signals, where the Nr1×M1 signals are echo signals of M1 signals that are sent by a radar to a target in a SIMO mode; obtaining Nt×Nr2×M2 signals, where the Nt×Nr2×M2 signals are echo signals of M2 signals that are sent by the radar to the target in a MIMO mode; performing first signal processing on the Nr1×M1 signals to obtain first processing data, where the first signal processing includes sequentially performing range FFT analysis, linear prediction, and Doppler FFT analysis; performing second signal processing on the Nt×Nr2×M2 signals to obtain second processing data, where the second signal processing includes range FFT analysis and Doppler FFT analysis; and performing velocity matching ambiguity resolution processing based on the first processing data and the second processing data.

20 Claims, 7 Drawing Sheets

SIGNAL PROCESSING METHOD AND APPARATUS

CROSS-REFERENCE TO RELATED APPLICATIONS

This disclosure is a continuation of International Application No. PCT/CN2020/106864, filed on Aug. 4, 2020, the disclosure of which is hereby incorporated by reference in its entirety.

TECHNICAL FIELD

This disclosure relates to the field of communication technologies, and in particular, to a signal processing method and apparatus.

BACKGROUND

Radar detection is widely applied to various fields, for example, an advanced driver assistant system (ADAS), an unmanned driving field, or the like. With the development of technologies, a higher range resolution and a higher angle resolution are required for the radar detection.

A radar may improve the range resolution by transmitting a larger bandwidth, and achieve the higher angle resolution by setting more multiple input multiple output (MIMO) arrays. A radar provided with the MIMO array may be referred to as a MIMO radar. The MIMO radar may support a large quantity of transmit antennas to transmit signals in turn. However, because the MIMO radar uses the antennas to transmit signals in turn, a relative pulse repetition interval (PRI) of a single antenna is long, and a detection range of the MIMO radar for a moving velocity of a target is reduced. As a result, the moving velocity of the target beyond a maximum velocity detection range of the MIMO radar is aliased into the detection range, resulting in velocity ambiguity of the target.

To resolve the foregoing problem, a single input multiple output (SIMO)+MIMO radar detection mechanism is further proposed in the industry. In the SIMO+MIMO mechanism, the radar may work in either MIMO mode or SIMO mode. The radar may detect the target through the SIMO mode and the MIMO mode respectively, and based on different PRI intervals of the SIMO mode and the MIMO mode, perform velocity matching ambiguity resolution processing on signals obtained in the MIMO mode by using signals obtained in the SIMO mode. However, with the development of technologies, precision of velocity matching ambiguity resolution processing performed on signals obtained in the SIMO+MIMO mode still faces a challenge.

SUMMARY

This disclosure provides a signal processing method and apparatus, to improve precision of velocity matching ambiguity resolution processing performed on signals in a SIMO+MIMO mode.

According to a first aspect, a signal processing method is provided, including: obtaining Nr1×M1 signals, where the Nr1×M1 signals are echo signals of M1 signals that are sent by a radar to a target in a SIMO mode, the SIMO mode corresponds to one transmit channel and Nr1 receive channels, and Nr1 and M1 are integers greater than 1; obtaining Nt×Nr2×M2 signals, where the Nt×Nr2×M2 signals are echo signals of M2 signals that are sent by the radar to the target in a MIMO mode, the MIMO mode corresponds to Nt transmit channels and Nr2 receive channels, and Nt, Nr2, and M2 are integers greater than 1; performing first signal processing on the Nr1×M1 signals to obtain first processing data, where the first signal processing includes sequentially performing the following processing: range FFT analysis, linear prediction, and Doppler FFT analysis, where the linear prediction is used to predict FFT data before or after a time domain of FFT data obtained by performing the range FFT analysis; performing second signal processing on the Nt×Nr2×M2 signals to obtain second processing data, where the second signal processing includes range FFT analysis and Doppler FFT analysis; and performing velocity matching ambiguity resolution processing based on the first processing data and the second processing data.

Optionally, that the linear prediction is used to predict FFT data before or after a time domain of FFT data obtained by performing the range FFT analysis means that a time domain signal corresponding to the FFT data obtained by performing prediction is a signal before or after a time domain signal of the FFT data obtained by performing the range FFT analysis.

Optionally, for the FFT data obtained by performing the range FFT analysis, the linear prediction may be performed after another type of signal processing (for example, coherent superposition of receive channels) is performed.

In a radar detection scenario, a quantity M1 of signals transmitted by a SIMO radar is far less than a quantity Nt×M2 of signals transmitted by a MIMO radar, and velocity resolution Δv and velocity measurement precision $\sigma_v$ measured in the SIMO mode is poorer than velocity resolution Δv and velocity measurement precision $\sigma_v$ measured in the MIMO mode. In other words, ranges of Δv and $\sigma_v$ of a target obtained in the SIMO mode and the MIMO mode do not match, which adversely affects precision of the velocity matching ambiguity resolution processing. Therefore, in a solution of this disclosure, the first signal processing including the linear prediction is performed on echo signals obtained in the SIMO mode to obtain the first processing data. Because the linear prediction is equivalent to extending a quantity of signals obtained in the SIMO mode, the velocity resolution Δv and the velocity measurement precision $\sigma_v$ of the target obtained in the SIMO mode may be improved. In this way, ranges of the velocity resolution Δv and the velocity measurement precision $\sigma_v$ of the target that are respectively obtained in the SIMO mode and the MIMO mode are closer to each other, thereby helping to improve the precision of the velocity matching ambiguity resolution processing performed based on signals obtained in the SIMO mode and the MIMO mode.

With reference to the first aspect, in some embodiments of the first aspect, the first signal processing includes sequentially performing the following processing: the range FFT analysis, coherent superposition of receive channels, the linear prediction, the Doppler FFT analysis, and CFAR.

After the range FFT analysis is performed on the Nr1×M1 signals obtained in the SIMO mode, the coherent superposition is performed on FFT data corresponding to different receive channels, and the linear prediction is performed by using superposed FFT data. Then, the velocity matching ambiguity resolution processing is performed based on data obtained after the linear prediction. Because the linear prediction may improve the velocity resolution Δv and the velocity measurement precision $\sigma_v$ of the target obtained in the SIMO mode, the ranges of the velocity resolution Δv and the velocity measurement precision $\sigma_v$ of the target that are respectively obtained in the SIMO mode and the MIMO mode are closer to each other, thereby helping to improve the precision of the velocity matching ambiguity resolution processing performed based on the signals obtained in the SIMO mode and the MIMO mode.

With reference to the first aspect, in some embodiments of the first aspect, the first signal processing includes sequentially performing the following processing: the range FFT analysis, the linear prediction, the Doppler FFT analysis, signal superposition, and the CFAR.

After the range FFT analysis is performed on the Nr1×M1 signals obtained in the SIMO mode, the linear prediction is respectively performed on the FFT data corresponding to different receive channels, and the velocity matching ambiguity resolution processing is performed based on the FFT data obtained by performing the linear prediction. Because the linear prediction may improve the velocity resolution $\Delta v$ and the velocity measurement precision $\sigma_v$ of the target obtained in the SIMO mode, the ranges of the velocity resolution $\Delta v$ and the velocity measurement precision $\sigma_v$ of the target that are respectively obtained in the SIMO mode and the MIMO mode are closer to each other, thereby helping to improve the precision of the velocity matching ambiguity resolution processing performed based on the signals obtained in the SIMO mode and the MIMO mode.

With reference to the first aspect, in some embodiments of the first aspect, the second signal processing further includes sequentially performing the following processing: the range FFT analysis, the Doppler FFT analysis, signal superposition, and CFAR.

With reference to the first aspect, in some embodiments of the first aspect, the performing first signal processing on the Nr1×M1 signals to obtain first processing data includes: performing the range FFT analysis on the Nr1×M1 signals to obtain Nr1×M1 pieces of 1-dimension FFT data; performing the coherent superposition of receive channels on the Nr1×M1 pieces of 1-dimension FFT data to obtain M1 pieces of 1-dimension FFT data; performing the linear prediction on the M1 pieces of 1-dimension FFT data to obtain M1+Y pieces of 1-dimension FFT data, where Y is a positive integer; performing the Doppler FFT analysis on the M1+Y pieces of 1-dimension FFT data to obtain one range-Doppler spectrum graph; and performing the CFAR detection on the range-Doppler spectrum graph to obtain the first processing data.

In the radar detection scenario, after the range FFT analysis is performed on the echo signals obtained in the SIMO mode, the coherent superposition is first performed on FFT data corresponding to a plurality of receive channels, the linear prediction is performed on the superposed FFT data, and the first processing data is obtained by performing subsequent data processing. Because the linear prediction is performed, the velocity resolution $\Delta v$ and the velocity measurement precision $\sigma_v$ of the target obtained in the SIMO mode may be improved. In this way, the ranges of the velocity resolution $\Delta v$ and the velocity measurement precision $\sigma_v$ of the target that are respectively obtained in the SIMO mode and the MIMO mode are closer to each other, thereby helping to improve precision of velocity ambiguity resolution processing performed based on the signals obtained in the SIMO mode and the MIMO mode.

With reference to the first aspect, in some embodiments of the first aspect, the performing first signal processing on the Nr1×M1 signals to obtain first processing data includes: performing the range FFT analysis on the Nr1×M1 signals to obtain Nr1×M1 pieces of 1-dimension FFT data; respectively performing the linear prediction on the Nr1×M1 pieces of 1-dimension FFT data based on different receive channels to obtain Nr1×(M1+Y) pieces of 1-dimension FFT data, where Y is a positive integer; respectively performing the Doppler FFT analysis on the Nr1×(M1+Y) pieces of 1-dimension FFT data based on different receive channels to obtain Nr1 first range-Doppler spectrum graphs; performing the signal superposition on the Nr1 first range-Doppler spectrum graphs to obtain one second range-Doppler spectrum graph; and performing the CFAR detection on the second range-Doppler spectrum graph to obtain the first processing data.

In the radar detection scenario, after the range FFT analysis is performed on the echo signals obtained in the SIMO mode, the linear prediction is first respectively performed on the FFT data obtained for different receive channels, then the Doppler FFT analysis and the signal superposition are performed, and the subsequent data processing is performed to obtain the first processing data. Because the linear prediction is performed, the velocity resolution $\Delta v$ and the velocity measurement precision $\sigma_v$ of the target obtained in the SIMO mode may be improved. In this way, the ranges of the velocity resolution $\Delta v$ and the velocity measurement precision $\sigma_v$ of the target that are respectively obtained in the SIMO mode and the MIMO mode are closer to each other, thereby helping to improve the precision of the velocity ambiguity resolution processing performed based on signals obtained in the SIMO mode and the MIMO mode.

With reference to the first aspect, in some embodiments of the first aspect, the performing second signal processing on the Nt×Nr2×M2 signals to obtain second processing data includes: performing the range FFT analysis on the Nt×Nr2×M2 signals to obtain Nt×Nr2×M2 pieces of 1-dimension FFT data; respectively performing the Doppler FFT analysis on the Nt×Nr2×M2 pieces of 1-dimension FFT data to obtain Nt×Nr2 third range-Doppler spectrum graphs; performing the signal superposition on Nt×Nr2 third range-Doppler spectrum graphs to obtain one fourth range-Doppler spectrum graph; and performing the CFAR detection on the fourth range-Doppler spectrum graph to obtain the second processing data.

According to a second aspect, a signal processing apparatus is provided. The apparatus has a function of implementing the foregoing method, and includes a corresponding component configured to perform steps or functions described in the foregoing method aspect. The steps or the functions may be implemented by using software, hardware (for example, a circuit), or a combination of hardware and software.

In an embodiment, the apparatus includes one or more processors and a communication unit. The one or more processors are configured to support the apparatus to perform functions of the foregoing method. For example, a random access signal is sent to an access network device. The communication unit is configured to support the apparatus to communicate with another device, to implement a receiving function and/or a sending function.

Optionally, the apparatus may further include one or more memories. The memory is configured to be coupled to the processor, and store program instructions and/or data that are/is necessary for the apparatus. The one or more memories may be integrated with the processor, or may be disposed independent of the processor. This is not limited in this disclosure.

Optionally, the apparatus may be a radar system.

Optionally, the apparatus may further be a chip.

According to a third aspect, a computer-readable storage medium is provided, and is configured to store a computer program. The computer program includes instructions used for performing the method in the first aspect or any embodiment of the first aspect.

According to a fourth aspect, a computer program product is provided. The computer program product includes computer program code. When the computer program code is run on a computer, the computer is enabled to perform the method in the first aspect or any embodiment of the first aspect.

According to a fifth aspect, a radar system is provided, including a processor and a receiver. The processor is configured to perform the method in the first aspect or any embodiment of the first aspect.

According to a sixth aspect, an intelligent vehicle is provided, including a processor and a receiver. The processor is configured to perform the method in the first aspect or any embodiment of the first aspect.

DESCRIPTION OF EMBODIMENTS

The following describes technical solutions of this disclosure with reference to the accompanying drawings.

Figure 1:
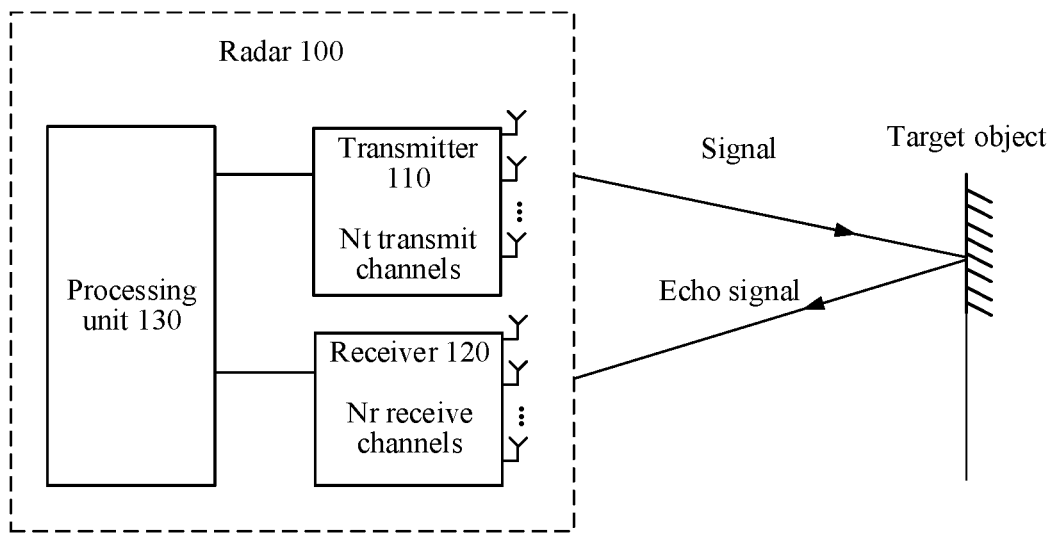
FIG. 1 is a schematic diagram of a radar detection system according to an embodiment of this disclosure.

FIG. 1 is a schematic diagram of a radar detection system 100 according to an embodiment of this disclosure. The radar detection system 100 may work in a SIMO mode, or may work in a MIMO mode. As shown in FIG. 1, the radar detection system 100 includes a transmitter 110, a receiver 120, and a processing unit 130. The transmitter 110 may include Nt transmit antennas, and each transmit antenna corresponds to one transmit channel. The receiver 120 includes Nr receive antennas, and each receive antenna corresponds to one receive channel. The Nt transmit antennas and the Nr receive antennas may form a MIMO antenna array.

When operating in the MIMO mode, the radar detection system 100 may transmit a signal to a target by using at least two transmit channels in Nt transmit channels, and receive, by using at least two receive channels in Nr receive channels, an echo signal reflected by the target.

When operating in the SIMO mode, the radar detection system 100 may transmit a signal to the target by using one of the Nt transmit channels, and receive, by using at least two receive channels among the Nr receive channels, the echo signal reflected by the target.

In other words, the SIMO mode and the MIMO mode may share a same set of transmit antennas and receive antennas (for example, a MIMO antenna array). Optionally, the SIMO mode and the MIMO mode may alternatively respectively use different transmit antennas and different receive antennas. This is not limited in this embodiment of this disclosure.

Optionally, quantities of receive channels used by the radar detection system 100 in the SIMO mode and the MIMO mode may be the same or may be different.

The processing unit 130 may be configured to control the transmitter 110 to send a signal, or control the receiver 120 to receive a signal, and may be further configured to process a to-be-sent signal or a receive signal.

The processing unit 130 may include a central processing unit ( ), a field programmable gate array (FPGA), or an application-specific integrated circuit (ASIC), or may be a processing chip of another type.

In this embodiment of this disclosure, a structure of the radar detection system 100 in FIG. 1 is merely used as an example instead of a limitation. A person skilled in the art may understand that the radar detection system 100 may further include more or fewer modules or units.

In this embodiment of this disclosure, the radar detection system 100 may also be referred to as a radar for short.

The SIMO mode is mainly used for performing velocity matching ambiguity resolution on a detection target in the MIMO mode. Therefore, in the industry, considering a radar update period, a quantity of signals transmitted in the SIMO mode is reduced as much as possible. This results in velocity resolution $\Delta v$ and velocity measurement precision $\sigma_v$ of a target in the SIMO mode when the velocity ambiguity resolution processing is performed. There is a great difference between the velocity resolution $\Delta v$ and the velocity measurement precision $\sigma_v$ of the target in the MIMO mode, which affects precision of performing the velocity matching ambiguity resolution processing on signals. To resolve the foregoing problem, the embodiments of this disclosure provide a signal processing method and apparatus, which may improve the precision of performing the velocity matching ambiguity resolution on the signals in a SIMO+MIMO radar detection mechanism.

In the method, the linear prediction (linear prediction) may be performed on signals obtained in the SIMO mode, and the velocity matching ambiguity resolution processing is performed on the signals obtained after the linear prediction, thereby improving the precision of performing the velocity matching ambiguity resolution on the signals.

Figure 2:
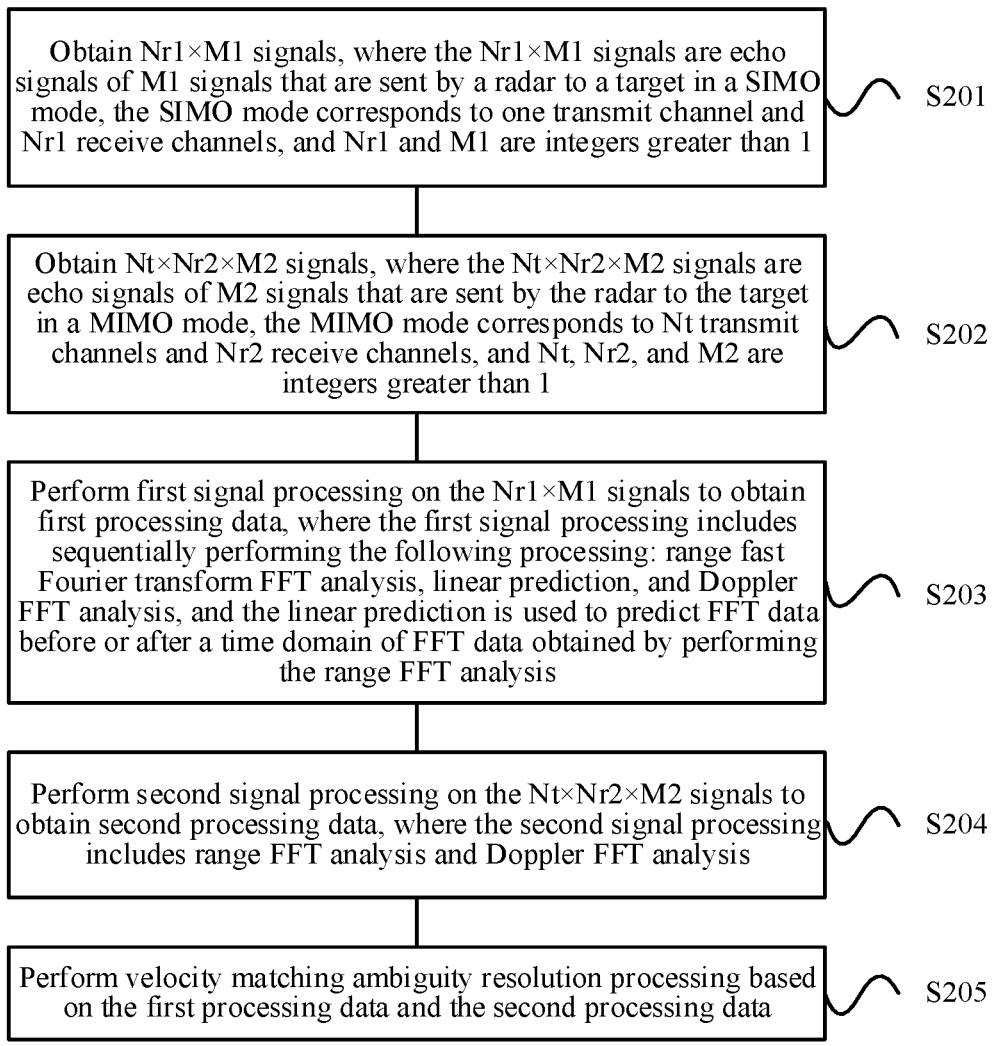
FIG. 2 is a schematic flowchart of a signal processing method according to an embodiment of this disclosure.

FIG. 2 is a schematic flowchart of a signal processing method according to an embodiment of this disclosure. The method in FIG. 2 is based on the SIMO+MIMO radar detection mechanism, and the method may be performed by the radar 100 in FIG. 1. The method in FIG. 2 includes the following steps.

S201. Obtain Nr1×M1 signals, where the Nr1×M1 signals are echo signals of M1 signals that are sent by a radar to a target in a SIMO mode, the SIMO mode corresponds to one transmit channel and Nr1 receive channels, and Nr1 and M1 are integers greater than 1.

S202. Obtain Nt×Nr2×M2 signals, where the Nt×Nr2×M2 signals are echo signals of M2 signals that are sent by the radar to the target in a MIMO mode, the MIMO mode corresponds to Nt transmit channels and Nr2 receive channels, and Nr2, Nt, and M2 are integers greater than 1.

In the SIMO mode, the radar sends and receives signals by using one transmit channel and Nr1 receive channels. Specifically, the radar sends M1 signals through one transmit channel. After the M1 signals are reflected by the target, the Nr1 receive channels receive the Nr1×M1 signals in total.

In the MIMO mode, the radar sends and receives signals by using Nt transmit channels and Nr2 receive channels. Specifically, the radar sends Nt×M2 signals through the Nt transmit channels. Each transmit channel sends M2 signals. After the Nt×M2 signals are reflected by the target, the Nr2 receive channels obtain the Nt×Nr2×M2 signals in total.

Optionally, Nr1 and Nr2 may be the same or may be different.

Optionally, the signal may be a chirp (chirp) signal. Alternatively, the signal may be a signal measured by using another unit.

S203. Perform first signal processing on the Nr1×M1 signals to obtain first processing data, where the first signal processing includes sequentially performing the following processing: range FFT analysis, linear prediction, and Doppler FFT analysis, and the linear prediction is used to predict FFT data before or after a time domain of FFT data obtained by performing the range FFT analysis.

That the linear prediction is used to predict FFT data before or after a time domain of FFT data obtained by performing the range FFT analysis means that a time domain signal corresponding to the FFT data obtained by performing prediction is a signal before or after a time domain signal of the FFT data obtained by performing the range FFT analysis. In another explanation, the linear prediction may refer to a mathematical method for calculating a future or past signal based on a linear function based on existing sampling point information or a signal. The sampling point information includes, for example, FFT data obtained by performing FFT analysis.

Optionally, the linear prediction may also be referred to as linear expansion (linear expansion) or linear estimation.

The linear prediction includes at least one of the following: forward prediction expansion and backward prediction expansion. The forward prediction expansion refers to predicting a future signal by using the existing sampling point information or the signal, and the backward prediction expansion refers to predicting a past signal by using the existing sampling point information or the signal.

The FFT analysis is used for performing frequency domain analysis on a time domain signal. Based on different features represented by an analysis result, the FFT analysis may include a plurality of types, for example, the range FFT analysis, the Doppler FFT analysis, or angle FFT analysis. The range FFT analysis is used for analyzing a correspondence between a spectrum of a signal and a distance of an observed target. The Doppler FFT analysis is used for analyzing a correspondence between the spectrum of the signal and a velocity of the observed target. The angle FFT analysis is used for analyzing a correspondence between the spectrum of the signal and an angle of the observed target.

Optionally, the FFT analysis may also be replaced by another time-frequency analysis manner, for example, discrete Fourier transform (discrete Fourier transform, DFT) analysis.

Optionally, the first signal processing may further include another type of signal processing manner, for example, signal superposition (or signal accumulation) or target detection. Common manners of target detection are constant false alarm rate detection (constant false alarm rate detection, CFAR), constant missed alarm rate detection, maximum value detection, and eigenvalue detection. The signal superposition may include coherent superposition or incoherent superposition of signals.

The CFAR may refer to a method for detecting a signal under a condition that a false alarm probability is kept constant in a radar system to determine whether a target exists. The false alarm probability may refer to a probability of misjudging a target that actually does not exist as a target that exists due to existence of noise when a threshold detection method is used in a radar detection process.

The constant missed alarm rate detection may refer to a method for determining whether the target exists by detecting the signal under a condition that a missed alarm probability is kept constant in the radar system. The missed alarm probability may refer to a probability of misjudging a target that actually exists as a target that does not exist due to the existence of noise when the threshold detection method is used in the radar detection process.

The maximum value detection may refer to a method for determining whether the target exists in the radar system by detecting whether a maximum value in the signal is greater than a predetermined value.

The eigenvalue detection may refer to a method for determining whether the target exists by detecting whether the signal has an eigenvalue in the radar system. The eigenvalue may refer to data representing a target feature.

As an example, the first signal processing may sequentially include the following types of processing: the range FFT analysis, the coherent superposition of different receive channels, the linear prediction, the Doppler FFT analysis, and the CFAR. The following describes in detail a first signal processing process in the example with reference to FIG. 3.

As another example, the first signal processing may sequentially include the following types of processing: the range FFT analysis, the Doppler FFT analysis, signal superposition, and CFAR. The signal superposition may be the coherent superposition, or may be the incoherent superposition. The following describes in detail a first signal processing process in the example with reference to FIG. 4.

Optionally, the first signal processing may not include the signal superposition or the target detection.

Optionally, assuming that a start moment for sending the M1 signals in the SIMO mode is a first moment T1, and a start moment for sending the M2 signals in the MIMO mode is a second moment T2, a time interval $\Delta t=|T2-T1|$ is less than a preset value. It should be understood that signals obtained in the SIMO mode and the MIMO mode need to be used for the velocity matching ambiguity resolution processing. Therefore, the M1 signals and the M2 signals should be sent simultaneously as much as possible. As an example instead of a limitation, the M1 signals and the M2 signals may be sent in a time of one frame.

S204. Perform second signal processing on the Nt×Nr2×M2 signals to obtain second processing data, where the second signal processing includes range FFT analysis and Doppler FFT analysis.

Optionally, the first signal processing may further include another type of signal processing manner, for example, the signal superposition or the CFAR.

S205. Perform velocity matching ambiguity resolution processing based on the first processing data and the second processing data.

Optionally, after the first processing data and the second processing data are obtained, the velocity matching ambiguity resolution processing includes a plurality of manners. For example, the velocity matching ambiguity resolution processing may be performed by using a Chinese remainder theorem. Alternatively, signal reconstruction is performed by using parameters of a receive signal and a transmit signal, so as to implement the velocity matching ambiguity resolution processing. The parameters of the receive signal include the first processing data and the second processing data.

In this embodiment of this disclosure, in a radar detection scenario, a quantity M1 of signals transmitted by a SIMO radar is far less than a quantity Nt×M2 of signals transmitted by a MIMO radar, and velocity resolution Δv and velocity measurement precision $\sigma_v$ measured in the SIMO mode are poorer than those measured in the MIMO mode. In other words, ranges of Δv and $\sigma_v$ of a target obtained in the SIMO mode and the MIMO mode do not match, which adversely affects precision of the velocity matching ambiguity resolution processing. Therefore, in a solution of this disclosure, the first signal processing including the linear prediction is performed on echo signals obtained in the SIMO mode to obtain the first processing data. Because the linear prediction is equivalent to extending a quantity of signals obtained in the SIMO mode, the velocity resolution Δv and the velocity measurement precision $\sigma_v$ of the target obtained in the SIMO mode may be improved. In this way, ranges of the velocity resolution Δv and the velocity measurement precision $\sigma_v$ of the target that are respectively obtained in the SIMO mode and the MIMO mode are closer to each other, thereby helping to improve the precision of the velocity matching ambiguity resolution processing performed based on signals obtained in the SIMO mode and the MIMO mode.

Figure 3:
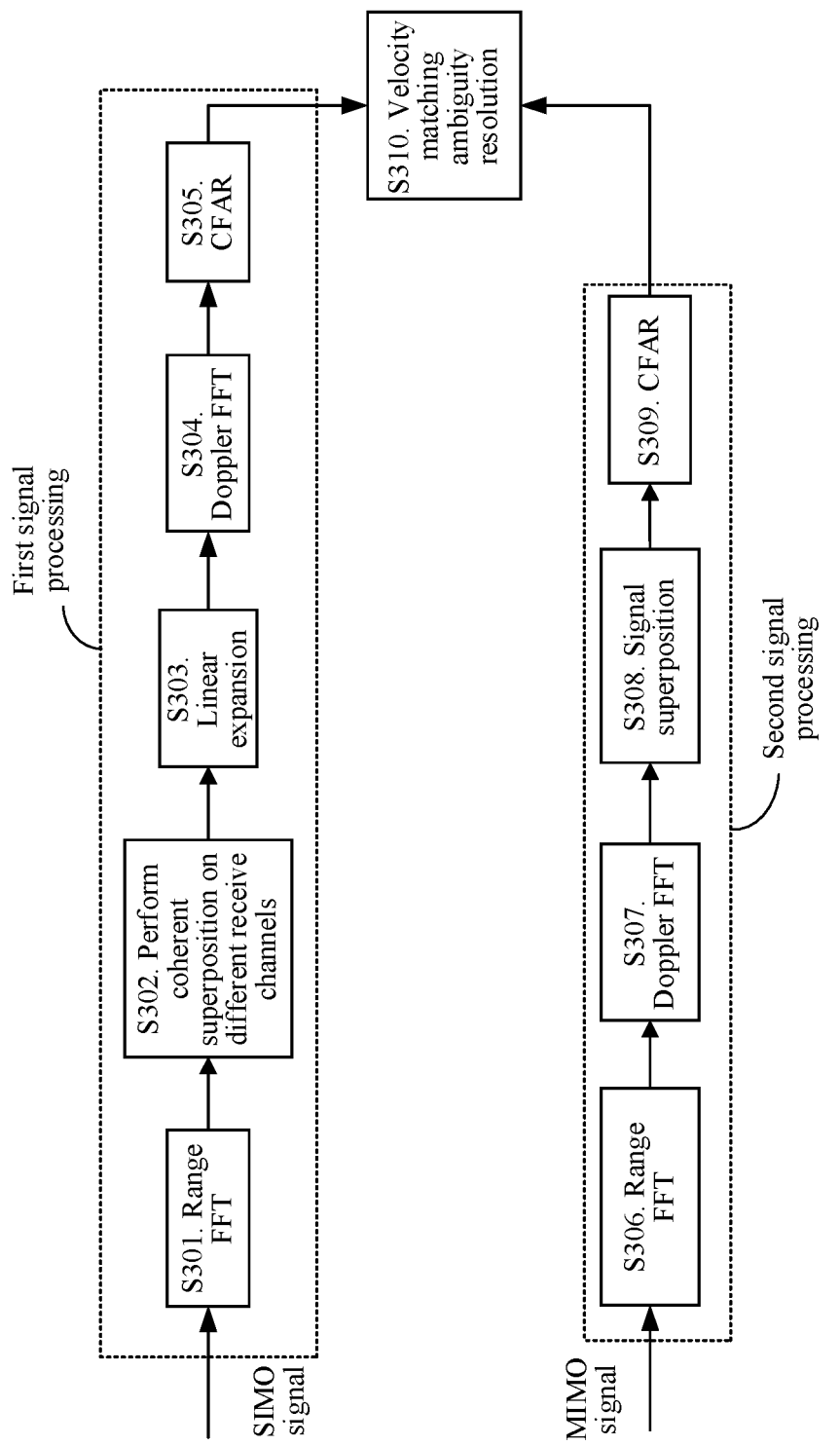
FIG. 3 is a schematic flowchart of a signal processing method according to an embodiment of this disclosure.

FIG. 3 is a schematic flowchart of a signal processing method according to an embodiment of this disclosure. Assuming that a radar sends M1 signals in a SIMO mode, then Nr1 receive channels obtain Nr1×M1 signals in total. The radar transmits M2 signals through each transmit channel in a MIMO mode, then Nr2 receive channels obtain Nt×Nr2×M2 signals in total.

S301 to S305 are used for describing a process of performing first signal processing on signals obtained in the SIMO mode, and S306 to S309 are used for describing a process of performing second signal processing on signals obtained in the MIMO mode. S310 is used for describing a velocity matching ambiguity resolution process. The signals obtained in the SIMO mode may be referred to as SIMO signals. The signals obtained in the MIMO mode may be referred to as MIMO signals. The method in FIG. 3 includes the following steps.

S301. Perform range FFT processing on Nr1×M1 SIMO signals obtained in the SIMO mode to obtain Nr1×M1 pieces of 1-dimension FFT (1-dimension FFT, 1D FFT) data.

In this embodiment of this disclosure, the 1-dimension FFT data is data obtained after only 1-dimension FFT transform is performed on an obtained time domain signal. Each piece of 1-dimension FFT data may include L pieces of FFT data. L represents a quantity of FFT points on which range FFT analysis is performed. L is a positive integer, for example, L=512.

S302. Perform coherent superposition on the Nr1×M1 pieces of 1-dimension FFT data obtained by Nr1 receive channels to obtain M1 pieces of 1-dimension FFT data.

S303. Perform linear prediction on the M1 pieces of 1-dimension FFT data to obtain M1+Y pieces of 1-dimension FFT data.

Y pieces of 1-dimension FFT data obtained by performing the linear prediction may be forward prediction expansion performed on the M1 pieces of 1-dimension FFT data, or may be backward prediction expansion, or may be forward prediction expansion+backward prediction expansion. Y is a positive integer.

Optionally, in S302 and S303, the coherent superposition may not be performed on all the Nr1×M1 pieces of 1-dimension FFT data obtained by the Nr1 receive channels, but M1 pieces of 1-dimension FFT data corresponding to a receive channel are randomly selected to perform the linear prediction.

S304. Perform Doppler FFT analysis on the M1+Y pieces of 1-dimension FFT data obtained by performing the linear prediction to obtain one range-Doppler spectrum graph.

S305. Perform CFAR detection on the range-Doppler spectrum graph to obtain first processing data.

Optionally, the CFAR may also be replaced by constant missed alarm rate detection, maximum value detection, and eigenvalue detection.

S306. Perform range FFT analysis on Nt×Nr2×M2 MIMO signals obtained in the MIMO mode to obtain Nt×Nr2×M2 pieces of 1-dimension FFT data.

S307. Respectively perform the Doppler FFT analysis on the Nt×Nr2×M2 pieces of 1-dimension FFT data to obtain Nt×Nr2 third range-Doppler spectrum graphs.

S308. Perform signal superposition on the Nt×Nr2 third range-Doppler spectrum graphs to obtain one fourth range-Doppler spectrum graph.

Optionally, that the performing signal superposition on the Nt×Nr2 third range-Doppler spectrum graphs may include all spectrum graphs in the Nt×Nr2 third range-Doppler spectrum graphs, or may include partial spectrum graphs.

S309. Perform the CFAR detection on the fourth range-Doppler spectrum graph to obtain second processing data.

S310. Perform velocity matching ambiguity resolution processing based on the first processing data and the second processing data.

In FIG. 3, in a radar detection scenario, after the range FFT analysis is performed on echo signals obtained in the SIMO mode, the coherent superposition is first performed on FFT data corresponding to a plurality of receive channels, the linear prediction is performed on superposed FFT data, and the first processing data is obtained by performing subsequent data processing. Because the linear prediction is performed, a velocity resolution Δv and a velocity measurement precision $\sigma_v$ of a target obtained in the SIMO mode may be improved. In this way, ranges of the velocity resolution Δv and the velocity measurement precision $\sigma_v$ of the target that are respectively obtained in the SIMO mode and the MIMO mode are closer to each other, thereby helping to improve precision of velocity ambiguity resolution processing performed based on signals obtained in the SIMO mode and the MIMO mode.

Figure 4:
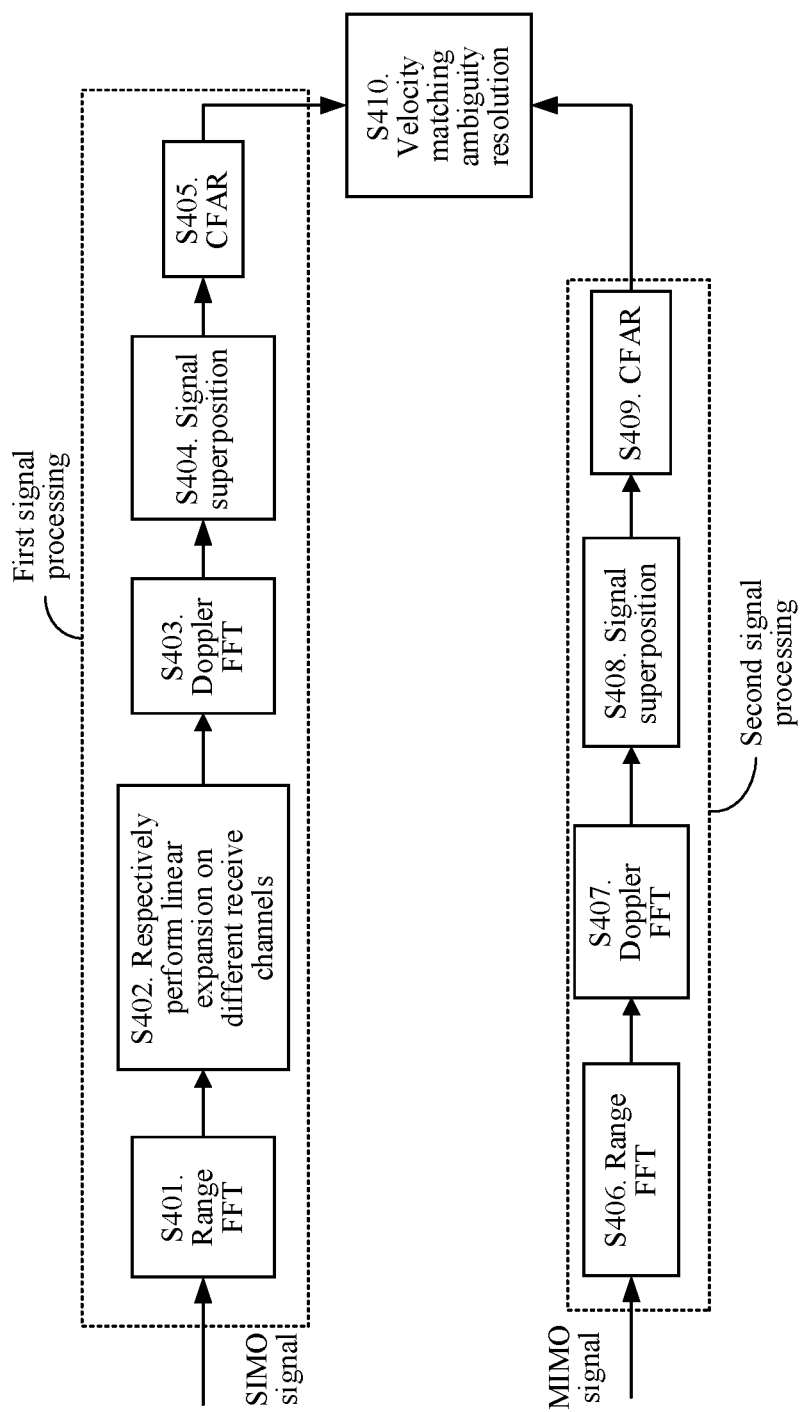
FIG. 4 is a schematic flowchart of a signal processing method according to still another embodiment of this disclosure.

FIG. 4 is a schematic flowchart of a signal processing method according to still another embodiment of this disclosure. Assuming that a radar transmits M1 signals in a SIMO mode, then Nr1 receive channels obtain Nr1×M1 signals in total. In a MIMO mode, the radar transmits M2 signals through each transmit channel. Therefore, Nr receive channels obtain Nt×Nr2×M2 pieces of echo data.

S401 to S405 are used for describing a process of performing first signal processing on signals obtained in the SIMO mode, and S406 to S409 are used for describing a process of performing second signal processing on signals obtained in the MIMO mode. S410 is used for describing a velocity matching ambiguity resolution process. The signals obtained in the SIMO mode may be referred to as SIMO signals. A signal obtained in the MIMO mode may be referred to as a MIMO signal. The method in FIG. 4 includes the following steps.

S401. Perform range FFT processing on Nr1×M1 SIMO signals obtained in the SIMO mode to obtain Nr1×M1 pieces of 1-dimension FFT (1-dimension FFT, 1D FFT) data.

In this embodiment of this disclosure, the 1-dimension FFT data is data obtained after only 1-dimension FFT transform is performed on an obtained time domain signal. Each piece of 1-dimension FFT data may include L pieces of FFT data. L represents a quantity of FFT points on which range FFT analysis is performed. L is a positive integer, for example, L=512.

S402. Respectively perform linear prediction on the Nr1×M1 pieces of 1-dimension FFT data based on different receive channels to obtain Nr1×(M1+Y) pieces of 1-dimension FTT data.

For example, based on different receive channels, the Nr1×M1 pieces of 1-dimension FFT data may be divided into Nr1 groups of 1-dimension FFT data, and each group of 1-dimension FFT data includes M1 pieces of FFT data. The linear prediction may be performed on each group of 1-dimension FFT data to finally obtain the Nr1×(M1+Y) pieces of 1-dimension FFT data.

Y pieces of 1-dimension FFT data obtained by performing the linear prediction may be forward prediction expansion performed on the M1 pieces of 1-dimension FFT data, or may be backward prediction expansion, or may be forward prediction expansion+backward prediction expansion.

S403. Respectively perform Doppler FFT analysis on the Nr1×(M1+Y) pieces of 1-dimension FFT data based on different receive channels to obtain Nr1 first range-Doppler spectrum graphs.

S404. Perform signal superposition on the Nr1 first range-Doppler spectrum graphs to obtain one second range-Doppler spectrum graph.

Optionally, the signal superposition manner may be coherent superposition, or may be incoherent superposition.

S405. Perform CFAR detection on the second range-Doppler spectrum graph to obtain first processing data.

S406. Perform range FFT analysis on Nt×Nr2×M2 signals to obtain Nt×Nr2×M2 pieces of 1-dimension FFT data.

S407. Respectively perform the Doppler FFT analysis on the Nt×Nr2×M2 pieces of 1-dimension FFT data to obtain Nt×Nr2 third range-Doppler spectrum graphs.

S408. Perform signal superposition on the Nt×Nr2 third range-Doppler spectrum graphs to obtain one fourth range-Doppler spectrum graph.

S409. Perform the CFAR detection on the fourth range-Doppler spectrum graph to obtain second processing data.

Optionally, the CFAR may also be replaced by constant missed alarm rate detection, maximum value detection, and eigenvalue detection.

S410. Perform velocity matching ambiguity resolution processing based on the first processing data and the second processing data.

In FIG. 4, in a radar detection scenario, after the range FFT analysis is performed on the echo signals obtained in the SIMO mode, the linear prediction is first respectively performed on FFT data obtained for different receive channels, then the Doppler FFT analysis and the signal superposition are performed, and the subsequent data processing is performed to obtain the first processing data. Because the linear prediction is performed, a velocity resolution Δv and a velocity measurement precision $\sigma_v$ of a target obtained in the SIMO mode may be improved. In this way, ranges of the velocity resolution Δv and the velocity measurement precision $\sigma_v$ of the target that are respectively obtained in the SIMO mode and the MIMO mode are closer to each other, thereby helping to improve precision of velocity ambiguity resolution processing performed based on signals obtained in the SIMO mode and the MIMO mode.

The following continues to describe the linear prediction method in the embodiments of this disclosure with reference to the accompanying drawings.

Figure 5:
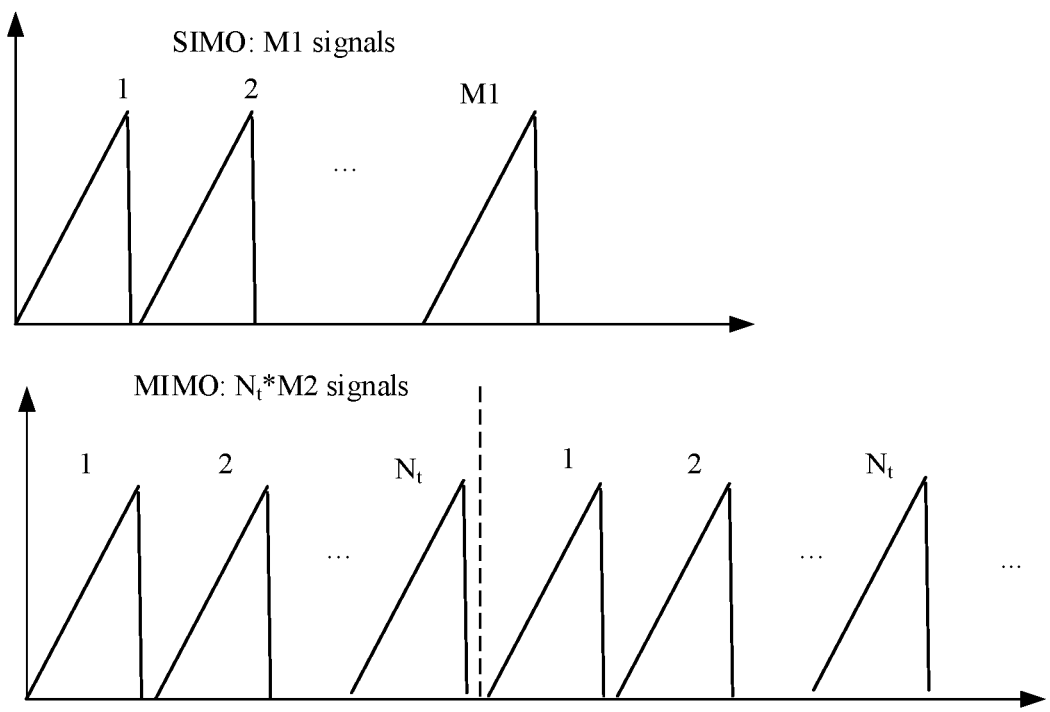
FIG. 5 is a schematic diagram of signal transmission in a SIMO+MIMO mode according to an embodiment of this disclosure.

FIG. 5 is a schematic diagram of signal transmission in a SIMO+MIMO mode according to an embodiment of this disclosure. As shown in FIG. 5, a radar transmits M1 signals in a SIMO mode, and transmits Nt×M2 signals through Nt transmit antennas in a MIMO mode. A maximum unambiguous velocity range $v_{max}$, velocity resolution Δv, and velocity measurement precision $\sigma_v$ of a target measured in the SIMO mode are respectively represented as Formulas (1) to (3):

$$v_{max} = \pm \frac{\lambda}{4T_{c1}} \tag{1}$$

$$\Delta v = \frac{\lambda}{2M_1 T_{c1}} \tag{2}$$

$$\sigma_v = \frac{\Delta v}{1.8\sqrt{2SNR}} \tag{3}$$

λ represents a transmit signal wavelength, $T_{c1}$ represents a PRI of a transmit signal in the SIMO mode, and SNR represents a signal-to-noise ratio of a target in a receive signal.

A maximum unambiguous velocity range $v_{max}$, velocity resolution Δv, and velocity measurement precision $\sigma_v$ of a target measured in the MIMO mode are respectively represented as Formulas (4) to (6):

$$v_{max} = \pm \frac{\lambda}{4N_t T_{c2}} \tag{4}$$

$$\Delta v = \frac{\lambda}{2M_2 N_t T_{c2}} \tag{5}$$

$$\sigma_v = \frac{\Delta v}{1.8\sqrt{2SNR}} \tag{6}$$

λ represents a transmit signal wavelength, $T_{c2}$ represents a PRI of a transmit signal in the MIMO mode, and SNR represents a signal-to-noise ratio of a target in a receive signal.

In a SIMO+MIMO radar transmission mode, the SIMO mode is mainly used for performing velocity matching ambiguity resolution processing on signals obtained in the MIMO mode, but is not helpful for CFAR detection and ranging and angle measurement. In this case, a quantity M1 of signals transmitted by a SIMO radar is far less than a quantity Nt×M2 of signals transmitted by a MIMO radar.

Therefore, it may be learned from comparison of Formulas (1) to (6) that $v_{max}$ of a target measured in the SIMO mode is far greater than $V_{max}$ of a target measured in the MIMO mode. However, Δv and $\sigma_v$ measured in the SIMO mode are poorer than those measured in the MIMO mode. In other words, ranges of Δv and $\sigma_v$ of a target respectively obtained in the SIMO mode and the MIMO mode do not match, which adversely affects precision of velocity matching ambiguity resolution.

According to a signal processing method provided in this embodiment of this disclosure, the linear prediction may be performed on signals obtained in the SIMO mode by using a linear prediction (or linear expansion) method, to improve velocity resolution and velocity precision of SIMO, thereby improving the precision of velocity matching ambiguity resolution.

After range FFT processing is performed on Nr1×M1 signals obtained in the SIMO mode, Nr1×M1 pieces of 1-dimension FFT data are obtained. The linear prediction is performed based on the Nr1×M1 pieces of 1-dimension FFT data, which may include but is not limited to the following several cases.

(i) Coherent superposition of receive channels is performed on the Nr1×M1 pieces of 1-dimension FFT data to obtain M1 pieces of 1-dimension FFT data, and the linear prediction is performed on the M1 pieces of 1-dimension FFT data.

(ii) The Nr1×M1 pieces of 1-dimension FFT data are divided into Nr1 groups of 1-dimension FFT data based on different corresponding receive channels. Each group of 1-dimension FFT data includes the M1 pieces of 1-dimension FFT data, and the linear prediction is performed on each group of 1-dimension FFT data.

(iii) The Nr1×M1 pieces of 1-dimension FFT data are divided into the Nr1 groups of 1-dimension FFT data based on different corresponding receive channels. Each group of 1-dimension FFT data includes the M1 pieces of 1-dimension FFT data, and one group of 1-dimension FFT data is randomly selected to perform the linear prediction.

A description is made below by using an example in which the linear prediction is performed on the M1 pieces of 1-dimension FFT data.

The M1 pieces of 1-dimension FFT data may be represented as $[X1, X2, \ldots, X_{M1}]$, each $X_i$ ($i=1, 2, \ldots, M1$) represents an L×1 vector, and L is a positive integer. L represents a quantity of FFT points of the range FFT analysis. As an example, L=512 or 1024.

The linear prediction includes forward prediction expansion and backward prediction expansion. The forward prediction expansion refers to predicting a future signal by using the existing sampling point information or the signal, and the backward prediction expansion refers to predicting a past signal by using the existing sampling point information or the signal.

A forward prediction expansion method and a backward prediction expansion method are separately described below. A concept of a measurement sample is introduced below, and the measurement sample represents a set of sample signals used for performing the linear prediction. The sample signal may include the 1-dimension FFT data. For example, the measurement sample may include all or some of the M1 pieces of 1-dimension FFT data, and the measurement sample may further include FFT data obtained by performing several times of linear prediction before. For example, in a calculation process of a first linear prediction, the sample signal may be selected from $[X_1, X_2, \ldots, X_{M1}]$.

As an example, the measurement sample may be represented as $[X_{M-p+1}, \ldots, X_M]$. The measurement sample includes p pieces of 1-dimension FFT data, and p>1.

(A) Forward Prediction Expansion

Figure 6:
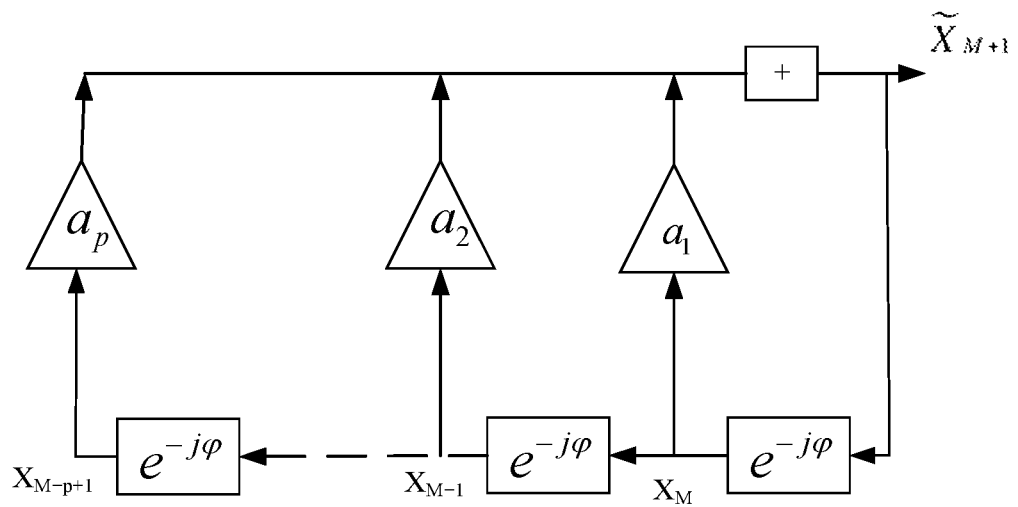
FIG. 6 is a schematic diagram of performing forward prediction expansion on a signal according to an embodiment of this disclosure.

FIG. 6 is a schematic diagram of a principle of performing forward prediction expansion on data according to an embodiment of this disclosure. The forward prediction expansion may further be referred to as forward estimation or forward expansion. The forward prediction expansion refers to estimating an $(M+1)^{th}$ signal $\vec{X}_{M+1}$ based on an existing measurement sample $[X_{M-p+1}, \ldots, X_M]$.

As shown in FIG. 6, in the forward prediction expansion, a forward estimation signal may be represented as $\vec{X}_{M+1}$. Based on the measurement sample $[X_{M-p+1}, \ldots, X_M]$, $\vec{X}_{M-1}$ may be represented as Formula (7).

$$\vec{X}_{M+1} = \sum_{j=1}^{p} X_{M+1-j} a_j \tag{7}$$

$a_j$ ($j=1, 2, \ldots, p$) represents a transfer coefficient.

A set of $a_j$ may be represented as a set $A_f = [a_p, \ldots, a_2, a_1]^T$ of estimated transfer coefficients, and $a_j$ ($j=1, 2, \ldots, p$) represents a transfer coefficient. Formula (8) shows a derivation formula for estimating $A_f$.

$$\begin{aligned} X_M &= \sum_{j=1}^{p} X_{M-j} a_j \\ &= X_f * A_f \end{aligned} \tag{8}$$

$X_f = [X_{M-p}, \ldots, X_{M-1}]$. It should be noted that $X_{M-p}$ also belongs to a known sample signal.

For example, $A_f$ may be solved by using a least square method. Specifically, as shown in Formula (9), a solution that minimizes a norm in Formula (9) is a solution of $A_f$.

$$A_f = \mathrm{argmin} \left\| X_M - \sum_{j=1}^{p} X_{M-j} a_j \right\|_2^2 \tag{9}$$

By solving Formula (9), a solution of $A_f$ is represented by Formula (10).

$$A_f = X_f^H (X_f X_f^H)^{-1} X_M \tag{10}$$

$X_f^H$ represents a conjugate transpose matrix of $X_f$.

(B) Backward Prediction Expansion

Figure 7:
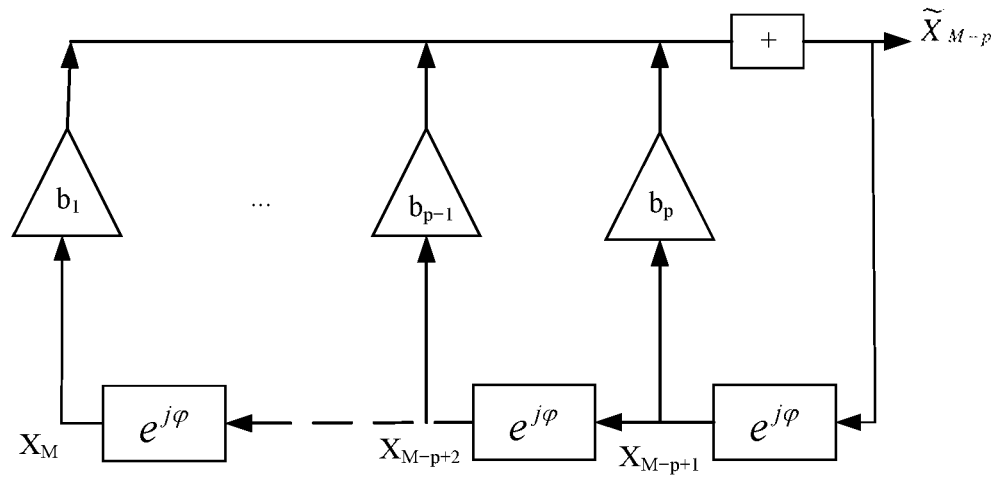
FIG. 7 is a schematic diagram of performing backward prediction expansion on a signal according to an embodiment of this disclosure.

FIG. 7 is a schematic diagram of a principle of performing backward expansion on data according to an embodiment of this disclosure. The backward prediction expansion may further be referred to as backward estimation or backward expansion.

As shown in FIG. 7, the backward prediction expansion refers to estimating an $(M-p)^{th}$ signal $\vec{X}_{M-p}$ based on a measurement sample $[X_{M-p+1}, \ldots, X_M]$. A backward estimation signal $\vec{X}_{M-p}$ may be represented by Formula (11).

$$\begin{aligned} \vec{X}_{M-p} &= \sum_{j=1}^{p} X_{M+1-j} b_j \\ &= X_b * A_b \end{aligned} \tag{11}$$

$X_b = [X_{M-p+1}, \ldots, X_M]$.

$b_j$ ($j=1, 2, \ldots, p$) represents a transfer coefficient of the backward prediction expansion. A set of $b_j$ may be represented as $A_b = [b_p, \ldots, b_1]^T$. After the transfer coefficient $b_j$ is estimated, backward prediction estimation of a signal may be performed. $A_b$ may be represented by Formula (12).

$$A_b = X_b^H (X_b X_b^H)^{-1} X_{M-p} \quad (12)$$

$X_b^H$ represents a conjugate transpose matrix of $X_b$.

It should be noted that as shown in FIG. 6 and FIG. 7, because the measurement sample $[X_{M-p+1}, \ldots, X_M]$ is a complex signal, a complex difference (or a phase difference) between samples is $e^{-j\varphi}$. For example, a complex difference between $X_{M-1}$ and $X_M$ is $e^{-j\varphi}$.

Optionally, as an example, in a SIMO+MIMO mode, if a MIMO signal is first transmitted and then a SIMO signal is transmitted in a same frame, and parameters such as a waveform and a period of the MIMO signal and the SIMO signal are consistent, a backward estimation signal of SIMO overlaps a measurement parameter of MIMO. In a case of overlapping, an estimated value of SIMO may be corrected by using a measurement result of MIMO.

The foregoing describes the signal processing method in the embodiments of this disclosure with reference to FIG. 1 to FIG. 7. The following describes the apparatus in the embodiments of this disclosure with reference to FIG. 8 and FIG. 9.

Figure 8:
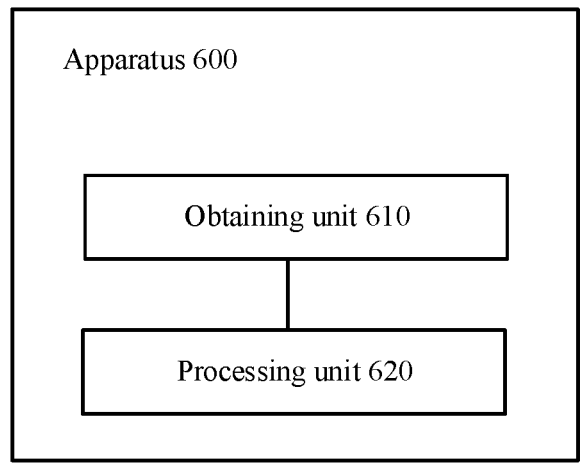
FIG. 8 is a schematic diagram of a structure of a signal processing apparatus according to an embodiment of this disclosure.

FIG. 8 is a schematic block diagram of a signal processing apparatus 600 according to an embodiment of this disclosure. The apparatus 600 may perform the method in FIG. 2 to FIG. 4 of this disclosure. The apparatus 600 includes an obtaining unit 610 and a processing unit 620.

The obtaining unit 610 is configured to obtain Nr1×M1 signals, where the Nr1×M1 signals are echo signals of M1 signals that are sent by a radar to a target in a SIMO mode, the SIMO mode corresponds to one transmit channel and Nr1 receive channels, and Nr1 and M1 are integers greater than 0.

The obtaining unit 610 is further configured to obtain Nt×Nr2×M2 signals. The Nt×Nr2×M2 signals are echo signals of M2 signals that are sent by the radar to the target in a MIMO mode, the MIMO mode corresponds to Nt transmit channels and Nr2 receive channels, and Nt, Nr2, and M2 are integers greater than 0.

The processing unit 620 is configured to perform first signal processing on the Nr1×M1 signals to obtain first processing data. The first signal processing includes sequentially performing the following processing: range FFT analysis, linear prediction, and Doppler FFT analysis. The linear prediction is used to predict FFT data before or after a time domain of FFT data obtained by performing the range FFT analysis.

The processing unit 620 is further configured to perform second signal processing on the Nt×Nr2×M2 signals to obtain second processing data. The second signal processing includes range FFT analysis and Doppler FFT analysis.

The processing unit 620 is further configured to perform velocity matching ambiguity resolution processing based on the first processing data and the second processing data.

Optionally, the apparatus 600 may include the radar 100 in FIG. 1. The obtaining unit 610 and the processing unit 620 may be the processing unit 130 in FIG. 1. A signal obtained by the obtaining unit 610 may be a signal received through the receiver 120 in FIG. 1.

Figure 9:
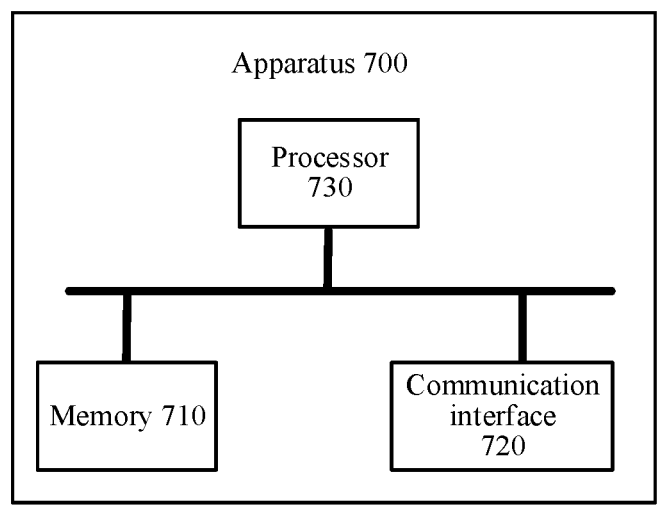
FIG. 9 is a schematic diagram of a structure of a signal processing apparatus according to an embodiment of this disclosure.

FIG. 9 is a schematic block diagram of a signal processing apparatus 700 according to an embodiment of this disclosure. The apparatus 700 may perform the method in FIG. 2 to FIG. 4 of this disclosure. The apparatus 700 includes one or more memories 710, one or more communication interfaces 720, and one or more processors 730. The processor 730 is configured to control the communication interface 720 to receive and send a signal. The memory 710 is configured to store a computer program. The processor 730 is configured to call the computer program from a memory 2010 and run the computer program, so that the apparatus 700 performs a corresponding procedure and/or operation in the method embodiments of this disclosure. For example, the apparatus 700 may perform the steps performed in FIG. 2 to FIG. 4. For brevity, details are not described herein again.

Optionally, the apparatus 700 may include the radar 100 in FIG. 1. The processor 730 may include the processing unit 130 in FIG. 1. The communication interface 720 may include the receiver 120 in FIG. 1.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this disclosure, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A signal processing method, comprising:
    obtaining Nr1×M1 signals, wherein the Nr1×M1 signals are echo signals of M1 signals that are sent by a radar to a target in a single input multiple output (SIMO) mode, the SIMO mode corresponds to one transmit channel and Nr1 receive channels, and Nr1 and M1 are integers greater than 1;
    obtaining Nt×Nr2×M2 signals, wherein the Nt×Nr2×M2 signals are echo signals of M2 signals that are sent by the radar to the target in a multiple input multiple output (MIMO) mode, the MIMO mode corresponds to Nt transmit channels and Nr2 receive channels, and Nt, Nr2, and M2 are integers greater than 1;
    performing first signal processing on the Nr1×M1 signals to obtain first processing data, wherein the first signal processing comprises sequentially performing the following processing: range fast Fourier transform (FFT) analysis, linear prediction, and Doppler FFT analysis, and the linear prediction is used to predict FFT data before or after a time domain of FFT data obtained by performing the range FFT analysis;
    performing second signal processing on the Nt×Nr2×M2 signals to obtain second processing data, wherein the second signal processing comprises range FFT analysis and Doppler FFT analysis; and
    performing velocity matching ambiguity resolution processing based on the first processing data and the second processing data.

2. The method according to claim 1, wherein the first signal processing comprises sequentially performing the following processing: the range FFT analysis, coherent superposition of receive channels, the linear prediction, the Doppler FFT analysis, and constant false alarm rate (CFAR) detection.

3. The method according to claim 1, wherein the first signal processing comprises sequentially performing the following processing: the range FFT analysis, the linear prediction, the Doppler FFT analysis, signal superposition, and constant false alarm rate (CFAR) detection.

4. The method according to claim 1, wherein the second signal processing further comprises sequentially performing the following processing: the range FFT analysis, the Doppler FFT analysis, signal superposition, and constant false alarm rate (CFAR) detection.

5. The method according to claim 2, wherein the performing first signal processing on the Nr1×M1 signals to obtain first processing data comprises:
    performing the range FFT analysis on the Nr1×M1 signals to obtain Nr1×M1 pieces of 1-dimension FFT data;
    performing the coherent superposition of receive channels on the Nr1×M1 pieces of 1-dimension FFT data to obtain M1 pieces of 1-dimension FFT data;
    performing the linear prediction on the M1 pieces of 1-dimension FFT data to obtain M1+Y pieces of 1-dimension FFT data, wherein Y is a positive integer;
    performing the Doppler FFT analysis on the M1+Y pieces of 1-dimension FFT data to obtain one range-Doppler spectrum graph; and
    performing the CFAR detection on the range-Doppler spectrum graph to obtain the first processing data.

6. The method according to claim 3, wherein the performing first signal processing on the Nr1×M1 signals to obtain first processing data comprises:
    performing the range FFT analysis on the Nr1×M1 signals to obtain Nr1×M1 pieces of 1-dimension FFT data;
    respectively performing the linear prediction on the Nr1×M1 pieces of 1-dimension FFT data based on different receive channels to obtain Nr1×(M1+Y) pieces of 1-dimension FFT data, wherein Y is a positive integer;
    respectively performing the Doppler FFT analysis on the Nr1×(M1+Y) pieces of 1-dimension FFT data based on different receive channels to obtain Nr1 first range-Doppler spectrum graphs;
    performing the signal superposition on the Nr1 first range-Doppler spectrum graphs to obtain one second range-Doppler spectrum graph; and
    performing the CFAR detection on the second range-Doppler spectrum graph to obtain the first processing data.

7. The method according to claim 4, wherein the performing second signal processing on the Nt×Nr2×M2 signals to obtain second processing data comprises:
    performing the range FFT analysis on the Nt×Nr2×M2 signals to obtain Nt×Nr2×M2 pieces of 1-dimension FFT data;
    respectively performing the Doppler FFT analysis on the Nt×Nr2×M2 pieces of 1-dimension FFT data to obtain Nt×Nr2 third range-Doppler spectrum graphs;
    performing the signal superposition on the Nt×Nr2 third range-Doppler spectrum graphs to obtain one fourth range-Doppler spectrum graph; and
    performing the CFAR detection on the fourth range-Doppler spectrum graph to obtain the second processing data.

8. An apparatus, comprising:
    a memory configured to store instructions; and
    a processor coupled to the memory and configured to execute the instructions to cause the apparatus to:
    obtain Nr1×M1 signals, wherein the Nr1×M1 signals are echo signals of M1 signals that are sent by a radar to a target in a single input multiple output (SIMO) mode, the SIMO mode corresponds to one transmit channel and Nr1 receive channels, and Nr1 and M1 are integers greater than 1;
    obtain Nt×Nr2×M2 signals, wherein the Nt×Nr2×M2 signals are echo signals of M2 signals that are sent by the radar to the target in a multiple input multiple output (MIMO) mode, the MIMO mode corresponds to Nt transmit channels and Nr2 receive channels, and Nt, Nr2, and M2 are integers greater than 1;
    perform first signal processing on the Nr1×M1 signals to obtain first processing data, wherein the first signal processing comprises sequentially performing the following processing: range fast Fourier transform (FFT) analysis, linear prediction, and Doppler FFT analysis, and the linear prediction is used to predict FFT data before or after a time domain of FFT data obtained by performing the range FFT analysis;

perform second signal processing on the Nt×Nr2×M2 signals to obtain second processing data, wherein the second signal processing comprises range FFT analysis and Doppler FFT analysis; and perform velocity matching ambiguity resolution processing based on the first processing data and the second processing data.

9. The apparatus according to claim 8, wherein the first signal processing comprises sequentially performing the following processing: the range FFT analysis, coherent superposition of receive channels, the linear prediction, the Doppler FFT analysis, and constant false alarm rate (CFAR) detection.

10. The apparatus according to claim 8, wherein the first signal processing comprises sequentially performing the following processing: the range FFT analysis, the linear prediction, the Doppler FFT analysis, signal superposition, and constant false alarm rate (CFAR).

11. The apparatus according to claim 8, wherein the second signal processing further comprises sequentially performing the following processing: the range FFT analysis, the Doppler FFT analysis, signal superposition, and constant false alarm rate (CFAR).

12. The apparatus according to claim 9, wherein the perform first signal processing on the Nr1×M1 signals to obtain first processing data comprises:
perform the range FFT analysis on the Nr1×M1 signals to obtain Nr1×M1 pieces of 1-dimension FFT data;
perform the coherent superposition of receive channels on the Nr1×M1 pieces of 1-dimension FFT data to obtain M1 pieces of 1-dimension FFT data;
perform the linear prediction on the M1 pieces of 1-dimension FFT data to obtain M1+Y pieces of 1-dimension FFT data, wherein Y is a positive integer;
perform the Doppler FFT analysis on the M1+Y pieces of 1-dimension FFT data to obtain one range-Doppler spectrum graph; and
perform the CFAR detection on the range-Doppler spectrum graph to obtain the first processing data.

13. The apparatus according to claim 10, wherein the perform first signal processing on the Nr1×M1 signals to obtain first processing data comprises:
perform the range FFT analysis on the Nr1×M1 signals to obtain Nr1×M1 pieces of 1-dimension FFT data;
respectively perform the linear prediction on the Nr1×M1 pieces of 1-dimension FFT data based on different receive channels to obtain Nr1×(M1+Y) pieces of 1-dimension FFT data, wherein Y is a positive integer;
respectively perform the Doppler FFT analysis on the Nr1×(M1+Y) pieces of 1-dimension FFT data based on different receive channels to obtain Nr1 first range-Doppler spectrum graphs;
perform the signal superposition on the Nr1 first range-Doppler spectrum graphs to obtain one second range-Doppler spectrum graph; and
perform the CFAR detection on the second range-Doppler spectrum graph to obtain the first processing data.

14. The apparatus according to claim 11, wherein the perform second signal processing on the Nt×Nr2×M2 signals to obtain second processing data comprises:
perform the range FFT analysis on the Nt×Nr2×M2 signals to obtain Nt×Nr2×M2 pieces of 1-dimension FFT data;
respectively perform the Doppler FFT analysis on the Nt×Nr2×M2 pieces of 1-dimension FFT data to obtain Nt×Nr2 third range-Doppler spectrum graphs;

perform the signal superposition on the Nt×Nr2 third range-Doppler spectrum graphs to obtain one fourth range-Doppler spectrum graph; and
perform the CFAR detection on the fourth range-Doppler spectrum graph to obtain the second processing data.

15. A computer program product comprising computer-executable instructions that are stored on a non-transitory computer-readable storage medium and that, when executed by a processor, cause an apparatus to:
obtain Nr1×M1 signals, wherein the Nr1×M1 signals are echo signals of M1 signals that are sent by a radar to a target in a single input multiple output (SIMO) mode, the SIMO mode corresponds to one transmit channel and Nr1 receive channels, and Nr1 and M1 are integers greater than 1;
obtain Nt×Nr2×M2 signals, wherein the Nt×Nr2×M2 signals are echo signals of M2 signals that are sent by the radar to the target in a multiple input multiple output (MIMO) mode, the MIMO mode corresponds to Nt transmit channels and Nr2 receive channels, and Nt, Nr2, and M2 are integers greater than 1;
perform first signal processing on the Nr1×M1 signals to obtain first processing data, wherein the first signal processing comprises sequentially performing the following processing: range fast Fourier transform (FFT) analysis, linear prediction, and Doppler FFT analysis, and the linear prediction is used to predict FFT data before or after a time domain of FFT data obtained by performing the range FFT analysis;
perform second signal processing on the Nt×Nr2×M2 signals to obtain second processing data, wherein the second signal processing comprises range FFT analysis and Doppler FFT analysis; and
perform velocity matching ambiguity resolution processing based on the first processing data and the second processing data.

16. The computer program product according to claim 15, wherein the first signal processing comprises sequentially performing the following processing: the range FFT analysis, coherent superposition of receive channels, the linear prediction, the Doppler FFT analysis, and constant false alarm rate (CFAR) detection.

17. The computer program product according to claim 15, wherein the first signal processing comprises sequentially performing the following processing: the range FFT analysis, the linear prediction, the Doppler FFT analysis, signal superposition, and constant false alarm rate (CFAR).

18. The computer program product according to claim 15, wherein the second signal processing further comprises sequentially performing the following processing: the range FFT analysis, the Doppler FFT analysis, signal superposition, and constant false alarm rate (CFAR).

19. The computer program product according to claim 16, wherein the perform first signal processing on the Nr1×M1 signals to obtain first processing data comprises:
perform the range FFT analysis on the Nr1×M1 signals to obtain Nr1×M1 pieces of 1-dimension FFT data;
perform the coherent superposition of receive channels on the Nr1×M1 pieces of 1-dimension FFT data to obtain M1 pieces of 1-dimension FFT data;
perform the linear prediction on the M1 pieces of 1-dimension FFT data to obtain M1+Y pieces of 1-dimension FFT data, wherein Y is a positive integer;
perform the Doppler FFT analysis on the M1+Y pieces of 1-dimension FFT data to obtain one range-Doppler spectrum graph; and perform the CFAR detection on the range-Doppler spectrum graph to obtain the first processing data.

20. The computer program product according to claim 17, wherein the perform first signal processing on the Nr1×M1 signals to obtain first processing data comprises:
- perform the range FFT analysis on the Nr1×M1 signals to obtain Nr1×M1 pieces of 1-dimension FFT data;
- respectively perform the linear prediction on the Nr1×M1 pieces of 1-dimension FFT data based on different receive channels to obtain Nr1×(M1+Y) pieces of 1-dimension FFT data, wherein Y is a positive integer;
- respectively perform the Doppler FFT analysis on the Nr1×(M1+Y) pieces of 1-dimension FFT data based on different receive channels to obtain Nr1 first range-Doppler spectrum graphs;
- perform the signal superposition on the Nr1 first range-Doppler spectrum graphs to obtain one second range-Doppler spectrum graph; and
- perform the CFAR detection on the second range-Doppler spectrum graph to obtain the first processing data.

* * * * *